United States Patent [19]

Corcoran, Jr. et al.

[11] Patent Number: 5,192,519

[45] Date of Patent: Mar. 9, 1993

[54] SUBSTITUTED STANNOSILICATES AND PREPARATION THEREOF

[75] Inventors: Edward W. Corcoran, Jr., Easton, Pa.; David E. W. Vaughan, Flemington, N.J.

[73] Assignee: Exxon Research and Engineering Company, Florham Park, N.J.

[21] Appl. No.: 848,596

[22] Filed: Mar. 9, 1992

Related U.S. Application Data

[63] Continuation-in-part of Ser. No. 486,471, Feb. 28, 1990, Pat. No. 5,110,571, which is a continuation-in-part of Ser. No. 91,657, Sep. 1, 1987, abandoned.

[51] Int. Cl.⁵ ............................................ C01B 33/34
[52] U.S. Cl. .................................... 423/713; 423/564

[58] Field of Search ...................... 423/326, 328, 564; 502/77

[56] References Cited

U.S. PATENT DOCUMENTS 5,110,571  5/1992  Corcoran, Jr. et al. ............ 423/326

Primary Examiner—R. Bruce Breneman
Attorney, Agent, or Firm—Jay Simon

[57] ABSTRACT

Highly crystalline substituted stannosilicates are formed by reacting a tin salt with a source of silica and a source of germanium, aluminum, zinc, gallium, and a hydroxide of a Group IA or Group IIA metal or an amine or alkylammonium compound.

16 Claims, 3 Drawing Sheets

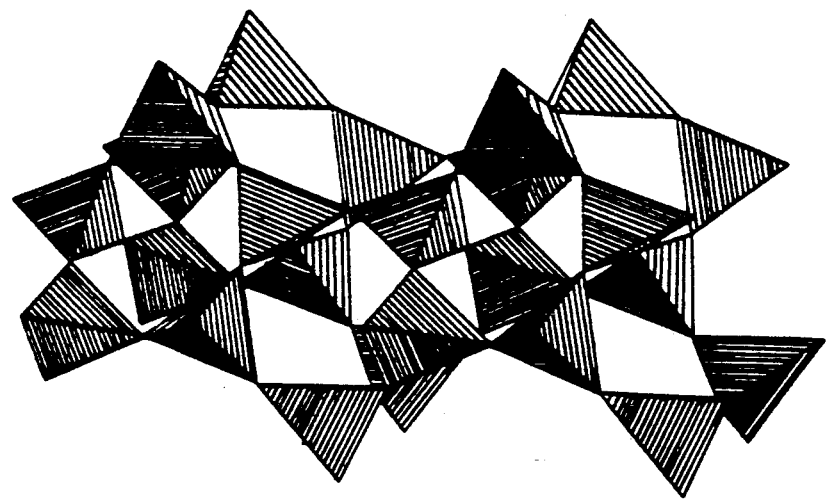
F I G. IA
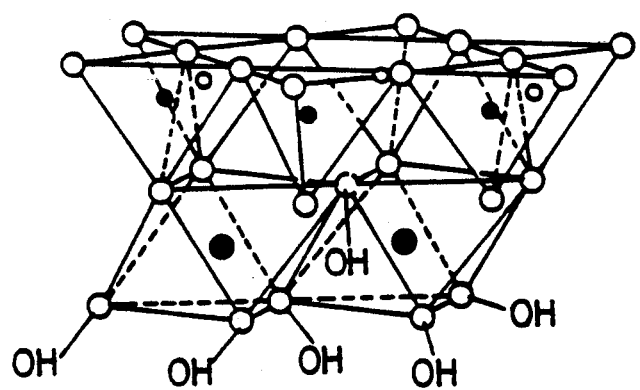
F I G. IB

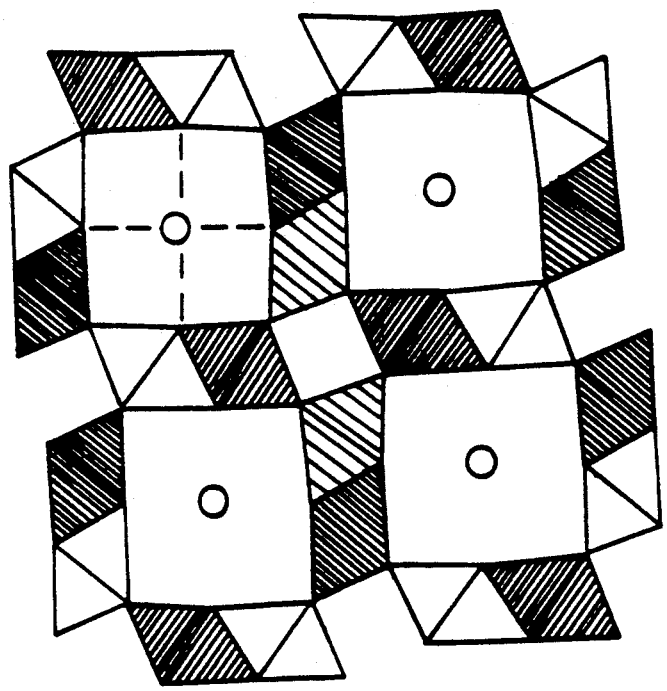
FIG. IC
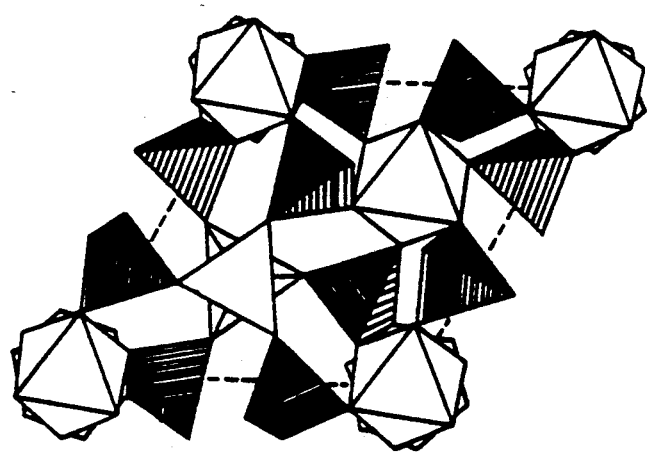
FIG. ID

SUBSTITUTED STANNOSILICATES AND PREPARATION THEREOF

CROSS REFERENCE TO RELATED APPLICATIONS

This application is a Continuation-in-part of U.S. Ser. No. 486,471 filed Feb. 28, 1990, now U.S. Pat. No. 5,110,571, which is a Continuation-in-part of U.S. Ser. No. 091,657 filed Sep. 1, 1987, now abandoned.

FIELD OF THE INVENTION

This invention relates to novel class of highly crystalline substituted, stannosilicate materials, in which silicon and metals substituted for a portion of the silicon are in tetrahedral coordination and tin is in five or six fold coordination, and the preparation thereof. These novel materials are useful as catalysts, catalyst supports, sorbents, e.g., for the separation of hydrogen sulfides from gas streams containing hydrogen contaminated with hydrogen sulfides or oxysulfides.

BACKGROUND OF THE INVENTION

The extensive research and development into alumino-silicates has been highly successful and studies have turned to other materials that might lead to similar types of structures.

There are numerous classes of microporous silicates of interest in sorption, catalysis, and ion exchange, in which silicon is tetrahedrally coordinated through oxygen to numerous other metals in either tetrahedral or octahedral coordination. Primary amongst the former are the zeolites (see Barrer, "Hydrothermal Chemistry of Zeolites", Academic Press (1982) for a review), and amongst the latter, the clays (see Brown and Brindley, Clays and Clay Minerals, Min. Soc. (London), (1978), for a review). Whereas the zeolites are characterized by three dimensional covalent bonding the clays comprise sheets covalently bonded within the sheet and weakly ionically bonded between the sheets. In some cases, when the sheets are electrostatically neutral, as in talc or kaolin, the sheets are held together by weak van der Waals forces. Other classes of similar structures include the sheet like silicic acid materials (e.g., Legally, Adv. Colloid and Interface Sc., Vol. II, p. 105 (1979)) and the many sheet materials rendered three dimensional by various pillaring reactions (see Vaughan, Amer. Chem. Soc. Symp. Ser. 368, p. 308 (1988) for a review).

Within each of these major families of materials are many subgroups. The three dimensional tetrahedrally coordinated structures now include a large number of metallo-phosphates (see Wilson, Flanigen et al, Amer. Chem. Soc. Symp. 398, p. 329 (1989); Proc. 7th Intl. Zeol. Conf., Elsevier Press (Tokyo), p. 103 (1986), for recent reviews), silicas and various modified silicas. The latter two include clathrasils (various $SiO_2$ analogues of the ice clathrates) and zeosils ($SiO_2$ analogues of various zeolite structures). This terminology has been reviewed by Liebau et al, Zeolites, Vol. 6, p. 373 (1986). Much recent work has focused on many metal modifications of the zeosils. An unusual and unexpected characteristic of these materials is a high concentration of "internal" hydroxyl groups (Woolery et al, Zeolites, Vol. 6, p. 14 1986)) which seem to readily react with numerous metal cations (U.S. Pat. No. 4,576,805; Eur. Pat. Appl. 0134,849; UK Pat. Appl. GB 2,024,790A). However, the metal content of such materials is usually less than about 1 to 2% wt. Various other methods of metal substitution into conventional zeolites could be envisioned by manipulating established methods of dealumination such as high temperature gas phase reactions (Fejes et al, React. Kinet. Catal. Letters, Vol. 14, p. 481 (1980); Beyer et al, Stud. Surf. Sci. Catal; Vol. 5, p. 203 (1980), Elsevier Press), aqueous ammonium metal fluoride treatments (Breck and Skeels, Proc. 6th Intl. Zeol. Conf., p. 87 (1984), Butterworths), or non-aqueous solvent "exchange" treatments (Intl. Pat. WO 88/01254), and substitutions under hydrothermal conditions. Whilst all of these methods may involve tin substitution into zeolite or zeolite like tetrahedral frameworks, they are distinctly different products from those of the instant invention, both in structure and composition (i.e., the level of tin included in the structure).

The many ways of coordinating or interlinking tetrahedra, octahedra or a combination of the two have been considered by several authors (e.g., A. F. Wells, "Structural Inorganic Chemistry", 5th Ed., Oxford Univ. Press, Ch. 5 (1984)). Although there are many thousands of possible structures in a strictly mathematical sense, the reality is that only a relatively small number of them exist in nature or can be synthesized in the laboratory. Four different general examples of such structures are shown in FIG. 1. The instant invention is concerned with materials in which silicon is in tetrahedral coordination and tin is in octahedral coordination, said materials having unique and definitive structures as identified by their characteristic x-ray diffraction patterns.

Oxide and mixed oxide crystalline structures with tin are well known in the literature, and in these cases all metals are octahedrally coordinated. Examples of these include $SnO_2$ itself (cassiterite), $Li_8SnO_6$ (Tromel, Zeit. Anorg. Allg. Chem., v. 368,p. 248 (1969)) and $Li_2SnO_3$ (Lang, ibid, v. 348, p. 246 (1966)) in addition to numerous temarz tin oxides (Clayden et al, J. Chem. Soc. Dalton, p. 843 (1989)) and rare earth stannates (Grey et al, J. Amer. Chem. Soc., v. III, p. 505 (1989)). In other materials tin is octahedral and other metals are tetrahedral, as in the minerals:

Eaherite A. A. Kossiahoff Am. Miner. 1976, v. 61, p. 956.
Mizerite I. E. Grey Am. Miner. 1979, v. 64, p. 1255.
Malayaite J. B. Higgins Am. Miner. 1977, v. 62, p. 801.
Stohesite A. Vorma Miner. Mag. 1963, v. 33, p. 615.
Sorensenite J. M. - Johansen Acter Chyst. 1976, v. B32, p. 2553.

Similar synthetic materials of this type are extensive (e.g.)

V. N. Rudenko et al, Mineral. Zh. 1983, 5, 70.
F. K. Larsen et al, Acta Chem. Scand. 1967, 21, 1281.
N. V. Zayakina et al, Dokl. Akad. Nauk SSSR 1980, 254, 353.
A. N. Safronov et al, Dokl. Akad. Nauk SSSR 1980, 255, 1114.
A. N. Safronov et al, Dokl. Akad. Nauk SSSR 1983, 269, 850.
I. V. Rozhdestvenskaya et al, Mineral. Zh. 1985, 7, 78.
V. V. Gorokhovskii et al, Izv. Akad. Nauk SSSR, Neorg. Mater. 1971, 7, 2033.
I. Y. Nekrasov, Dokl. Akad. Nauk SSSR 1973, 212, 705.
I. V. Nekrasov et al, Dokl. Akad. Nauk SSSR 1977, 232, 909.

I. A. Nekrasov et al, Fiz..Khim. Petrol. 1978, 8, 193.
I. Y. Nekrasov et al, Dokl. Akad. Nauk SSSR 1978, 243, 1286.
I. Y. Nekrasov et al, Dokl. Akad. Nauk SSSR 1981, 261, 479.
G. T. Desai and D. R. Baxi, Indian J. Tech. 1978, 16, 201.
A. N. Christiansen, Acta. Chem. Scand., 24. p. 1287 (1970).

Many of these have been reviewed by Lieban (in Structural Chemistry of Silicates, Springer-Verlag (1985)). However, in none of these cases are the materials of this invention reported, nor would one expect to make them using the methods of syntheses used by those researchers.

In addition to the crystalline materials detailed above are many amorphous or gel materials made by cogellation of a stannate with a silicate. In some cases these comprise true gels, but in other cases they comprise tin hydroxide precipitated in a matrix of silica gel. Numerous of these have been evaluated as ion exchangers (e.g., U.S. Pat. No. 4,329,328) and catalysts (Tanabe, "Solid acids and bases", p. 71, Kodansha Press (1970)).

SUMMARY OF THE INVENTION

Novel, highly crystalline substituted, stannosilicates having the generic formula:

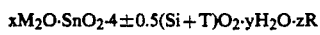

$$xM_2O \cdot SnO_2 \cdot 4 \pm 0.5(Si+T)O_2 \cdot yH_2O \cdot zR$$

wherein M may be any Group IA or, where $M_2O$ becomes MO, Group IIA metal, or a quaternary alkyl ammonium or alkylamine, e.g., tetraethylamine; and wherein T is germanium, gallium, aluminum, zinc or mixtures thereof; and
x is 1.5 to 4
y is 4 to 15
R is an amine
z is 0 to 4
and the ratio of (Al, Zn, Ga, and/or Ge)/Si is between 0.02 and 0.40. The silicon and the germanium, aluminum, gallium, or zinc are tetrahedrally coordinated through oxygen, and tin is octahedrally coordinated through oxygen and hydroxyl groups to form three dimensional framework structures within which the cations and alkylammonium molecules are located to charge balance the structure. The ion. exchange properties of these materials, and their properties of reversibly sorbing water and other polar molecules, confirms their microporous nature in contrast to the non-sorbing dense structures of the prior art.

Thus, the framework substituted stannosilicates of this invention contain a backbone or framework comprising tin, silicon (and its substituents, Ga, Al, Ge, Zn or mixtures thereof), and oxygen in which the tin is octahedrally coordinated. The ratio of tin to tetrahedral elements (Si and its substituents) in the framework is about 1:3.5 to about 1:4.5 and the tin is not exchangeable and essentially all of the tin is in the framework.

They are prepared by reacting a base, that is, a Group IA or Group IIA metal (e.g., sodium, potassium cesium, rubidium, magnesium, calcium, strontium) hydroxide or mixtures thereof or quaternary amine with a water soluble tin salt, e.g., chlorides, nitrates, sulfates or salts derived from dissolving tin oxide in an acid or base, and silica or a source of silica and a source of soluble forms of germanium, zinc, aluminum, gallium, or mixtures thereof in an aqueous medium at conditions leading to the formation of these novel crystalline materials. Such soluble forms may be germanates, aluminates, gallates, zincates or acid salts of Ge, Al, Zn and/or Ga, such as chlorides, nitrates, sulfates, etc.

DESCRIPTION OF THE DRAWINGS

FIG. 1 (a)-(d) shows four different kinds of structures comprising linked oxygen tetrahedra, octahedra or mixtures of both of these. In addition to corner sharing, edge and face shared octahedra are also common in natural and synthetic materials.

FIG. 1(a) is the chain of corner shared tetrahedra found in the zeolite mineral mordenite (Meier, "Molecular Sieves", Ed. R. M. Barrer, Soc. Chem. Ind. (London), p. 41 (1968)).

FIG. 1(b) is an illustration of sheets of corner shared tetrahedral linked to corner and edge shared octahedra in the mineral kaolinite, a linkage typical of all the clay minerals.

FIG. 1(c) is made up of edge and face shared octahedra, in this case characteristic of the mineral hollandite and the synthetic form $\alpha$-$MnO_2$, and typical of numerous oxides of W, Mn, Ti and Nb (see for a review, Wadsley, "Nonstoichiometric Compounds", Ed. L. Mandelcorn, Academic Press (London), p. 99 (1964)).

FIG. 1(d) comprises a three dimensional structure of $Si_5P_6O_{25}$ (Mayer, Monatsh. Chem., 105. p. 46 (1974)) comprising Si and P tetrahedral linked to Si octahedra.

DESCRIPTION OF THE INVENTION

Figure 2:
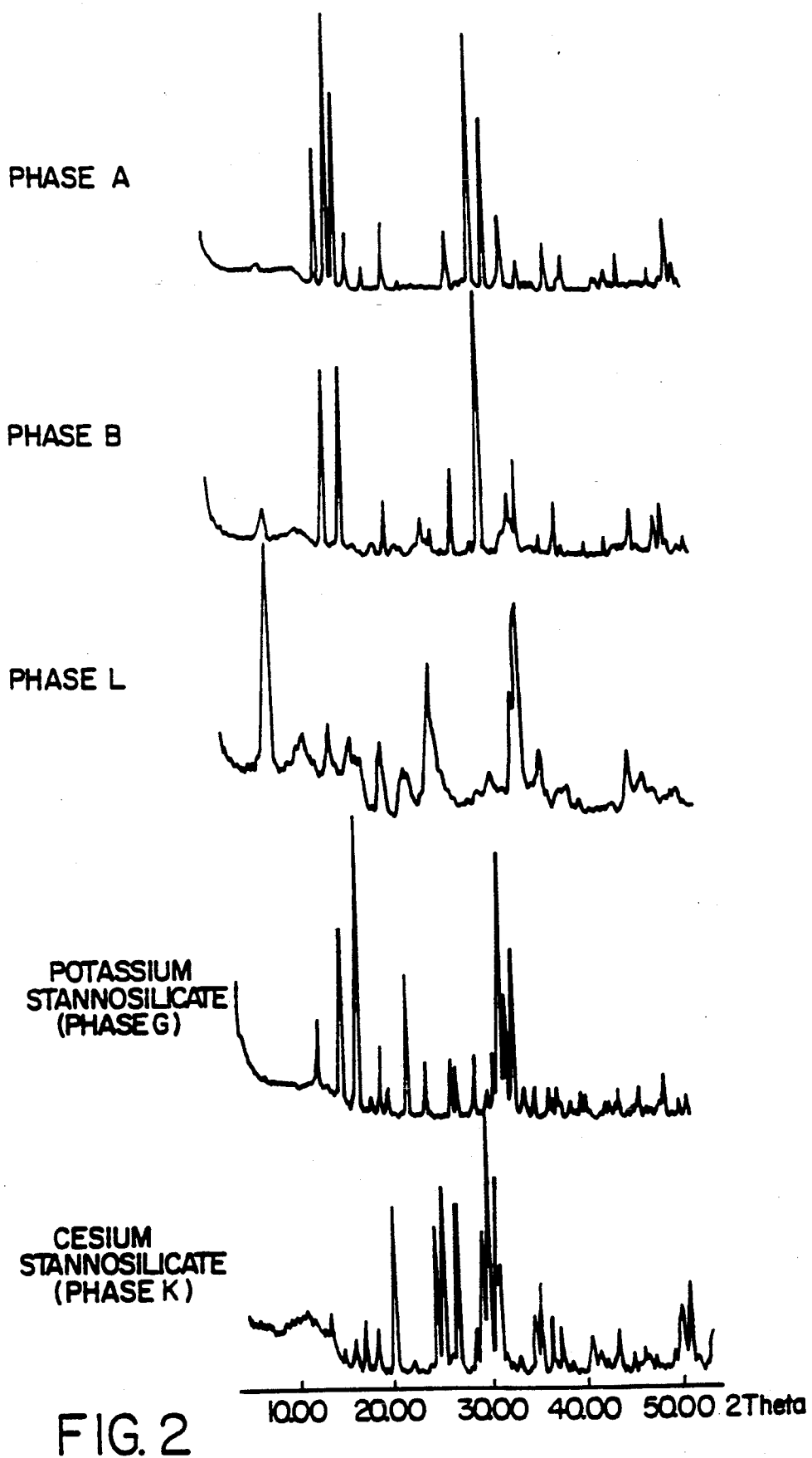
FIG. 2 comprises x-ray diffraction patterns (Cu $K_d$ radiation) for the novel substituted, stannosilicate phases A, B, and G of this invention.

Of the metal salts reacted with silica and germania, alumina, zinc, gallia, or mixtures thereof and the tin salt, the alkali metals: lithium, sodium, potassium, rubidium, cesium and mixtures thereof are preferred. Particularly preferred are sodium and potassium or mixtures thereof. In a preferred embodiment, the novel substituted, stannosilicates are formed using a mixed cation preparation, that is, lithium and sodium hydroxides, sodium and cesium hydroxides. Generally, mixtures provide substituted, stannosilicates of enhanced purity over preparations using only one alkali salt.

The reaction generally occurs under autogenous pressure at temperatures above about 90° C. and below about 250° C., preferably 150-225° C. The ratio of tin to silicon and substituents is no greater than about 1:20 and preferably about 1:2 to about 1:20, while the ratio of tin to germanium, aluminum, zinc, gallium or mixtures thereof is about 0 to 2.0.

The reactants generally combine to form a gel-like substance and crystallization occurs at reaction temperatures for a period of a few days to several weeks, e.g., seven days to eight weeks. After the appropriate time period, the reaction is quenched, the crystalline powder is recovered by, for example, filtration, and thoroughly washed and dried. Drying can be accomplished by an overnight heating at about 100° C. Impurities can be removed by an acid treatment, e.g., 1N HCl. Generally the aluminum substituted forms crystallize in less time than the germanium and gallium forms.

Often, it is preferred to age the reaction mixture at ambient conditions, i.e., below about 50° C. for at least about 3 hours, preferably at least about 24 hours, to allow nucleation. Alternatively, nucleation can be effected by adding a nucleating compound such as a finely divided oxide, e.g., alumina, or a nucleation solution as used in zeolite synthesis and reported in U.S. Pat. Nos. 3,808,326 and 4,178,352. Up to about 10 vol % nucleating compound can be employed.

Thermal dehydration at, for example, 300° C. will drive off water and the x-ray diffraction pattern will change slightly to show a contraction of the lattice, or movement of cations, or both. In adsorbent or catalytic processes the substituted, stannosilicate is usually dried or calcined to remove pore filling water cations or amine and in the generic formula shown above, y or z or both may then be zero.

The following examples will further illustrate this invention.

Reactant grade stannous chloride pentahydrate and anhydrous stannic chloride were used without further purification. Colloidal silica (Ludox HS-40) was obtained from DuPont and fumed silica (Cabosil) was obtained from Cabot Corp. Germanates, aluminates, zincates and gallates were made by dissolving the respective oxides or hydroxides in hot concentrated alkali solutions. All reactions were carried out hydrothermally in 75 ml stainless steel autoclaves under autogenous pressures. Powder x-ray diffraction measurements were conducted on a Siemens D500 powder diffractometer using a Siemens DIFFRAC-5 data system.

Reactants were thoroughly mixed at room temperature according to the ratio 2-8 $M_2O:SnO_2:2-20(Si, Al, Zn, Ga, Ge)O_2:0-2:80-180\ H_2O$ where $M = NH_4$, Na, K, Cs, Li, Rb, or alkyl ($C_1$–$C_4$) quaternary ammonium mixtures of two or more cations. The resulting gel was then reacted at a temperature between 150° C. and 250° C. for period lasting between one week and two months. At the end of this time the autoclave was cooled to room temperature and the solid product separated by filtration. The crystalline powder was then washed repeatedly with water and dried at 100° C. The following are representatives of typical syntheses in the substituted sodium stannosilicate system. The phases are identified by their unique x.ray diffraction patterns.

EXAMPLE 1

A tin (IV) chloride pentahydrate (Aldrich) solution was prepared by addition of the solid to distilled water. A second solution was produced by combining sodium hydroxide (Fisher) and 40% colloidal silica (HS-40, DuPont) in distilled water followed by vigorous stirring, a source of alumina was next added to the second solution and sometimes heated to aid in dissolution. The two mixtures were combined at room temperature by slow addition of the alumina/silica solution to the aqueous tin chloride solution with rapid stirring (exothermic), producing a thick white gel. The gel was reacted in a polytetrafluoroethylene-lined autoclave (Parr) at 200° C. to produce a white solid after the reactor was cooled to room temperature. This solid was washed repeatedly with distilled water, filtered, and dried to yield a fine white powder. Reactant ratios, sources, and conditions are given in Table 1. Chemical analyses of products are given in Table 2.

TABLE 1

REACTION CONDITIONS

| EXPERIMENT | REACTANT RATIOS | ALUMINA SOURCE | REACTION TIME | PHASE |
|---|---|---|---|---|
| 1 | $2Na_2O:3.8SiO_2:SnO_2:0.1Al_2O_3:80H_2O$ | aluminum oxide hydrate (C-31, Alcoa) | 21 days | A |
| 2 | $2Na_2O:3.6SiO_2:SnO_2:0.2Al_2O_3:80H_2O$ | aluminum oxide hydrate (C-31, Alcoa) | 14 days | A |
| 3 | $2Na_2O:3.8SiO_2:SnO_2:0.1Al_2O_3:80H_2O$ | aluminum chloride hydrate (Baker) | 21 days | A |
| 4 | $2Na_2O:3.6SiO_2:SnO_2:0.2Al_2O_3:80H_2O$ | aluminum chloride hydrate (Baker) | 14 days | A |
| 5 | $2Na_2O:3.6SiO_2:SnO_2:0.2Al_2O_3:80H_2O$ | sodium aluminate (Fisher) | 21 days | A |

TABLE 2

CHEMICAL ANALYSES

| EXPERIMENT | WT % Na | WT % Sn | WT % Si | WT % Al | WT % Al/Si |
|---|---|---|---|---|---|
| 1 | 12.16 | 22.79 | 19.51 | 1.60 | .09 |
| 2 | 10.93 | 23.66 | 19.07 | 2.22 | .12 |
| 3 | 10.00 | 25.14 | 20.70 | 1.16 | .06 |
| 4 | 10.17 | 21.76 | 19.77 | 2.09 | .11 |
| 5 | — | — | — | — | — |

Phase A was the only pure phase made in these experiments. The typical x-ray diffraction pattern for phase A is shown in Table 3.

TABLE 3

X-RAY DIFFRACTION PATTERN FOR PHASE A

| dÅ | I/Io |
|---|---|
| 6.33 ± 0.15 | 29 |
| 5.83 ± 0.15 | 100 |
| 5.56 ± 0.15 | 42 |
| 5.19 ± 0.10 | 12 |
| 4.73 ± 0.10 | 8 |
| 4.28 ± 0.10 | 18 |
| 3.30 ± 0.08 | 23 |
| 3.05 ± 0.08 | 73 |
| 2.91 ± 0.05 | 69 |
| 2.77 ± 0.05 | 27 |
| 2.64 ± 0.05 | 11 |
| 2.45 ± 0.05 | 15 |
| 2.35 ± 0.05 | 9 |

EXAMPLE 2

A tin (IV) chloride pentahydrate (Aldrich) solution was prepared by addition of the solid to distilled water; 20% colloidal alumina (AL-20, PQ Corp.) was stirred into this solution and a white precipitate formed. A second solution was produced by dissolving base in distilled water and combining this solution with colloidal silica (HS-40, DuPont). This second mixture was slowly combined with the tin/alumina solution, with vigorous stirring, to produce a thick white gel (exothermic). The gel was reacted in a polytetrafluoroethylene-lined autoclave (Parr) at 200° C. to produce a white solid after the reactor was cooled to room temperature. This solid was washed repeatedly with distilled water, filtered, and dried to yield a fine white powder. Reactant ratios, sources, and conditions are given in Table 4. Chemical analyses of products are given in Table 5. In these experiments Phase A crystallized from the sodium experiments and Phase G from the potassium experiments. A typical x.ray diffraction pattern for Phase G is given in Table 6.

EXAMPLE 3

A tin (IV) chloride pentahydrate (Aldrich) solution was prepared by addition of the solid to distilled water;

20% colloidal alumina (AL-20, PQ Corp.) was stirred into this solution and a white precipitate formed. An aqueous potassium hydroxide (Fisher) solution was added to the tin chloride solution and stirred., colloidal silica (HS-40, DuPont) was added to the mixture (to give a final reactant ratio of $2K_2O:3.8SiO_2:SnO_2:0.1Al_2O_3:80H_2O$) and the resulting gel stirred until homogeneous. The gel was reacted in a polytetrafluoroethylene-lined autoclave (Parr) at 200° C. for 21 days to produce a white solid after the reactor was cooled to room temperature. This solid was washed repeatedly with distilled water, filtered, and dried to yield a fine white powder (Phase G). Chemical analysis indicated 13.67% K, 22.82% Sn, 18.69% Si, and 0.92% Al.

EXAMPLE 4

A tin (IV) chloride pentahydrate (Aldrich) solution was prepared by addition of the solid to distilled water. A second solution was produced by combining either sodium or potassium hydroxide (Fisher) and 40% colloidal silica (HS-40, DuPont) in distilled water followed by vigorous stirring; gallium oxide (Aldrich) was next added to the second solution and sometimes heated to aid in dissolution. The two mixtures were combined at room temperature by slow addition of the gallium oxide/silica solution to the aqueous tin chloride solution with rapid stirring (exothermic), producing a thick white gel. The gel was reacted in a polytetrafluoroethylene-lined autoclave (Parr) at 200° C. to produce a white solid after the reactor was cooled to room temperature. This solid was washed repeatedly with distilled water, filtered, and dried to yield a fine white powder. Reactant ratios, sources, and conditions are given in Table 7. Chemical analyses of products are given in Table 8. A typical x.ray diffraction pattern for phase B is shown in Table 9.

TABLE 4

| | | REACTION CONDITIONS | | |
|---|---|---|---|---|
| EXPERIMENT | REACTANT RATIOS | ALUMINA SOURCE | REACTION TIME | PHASE |
| 6 | $2Na_2O:3.8SiO_2:SnO_2:0.1Al_2O_3:80H_2O$ | sodium hydroxide (Fisher) | 21 days | A |
| 7 | $2Na_2O:3.6SiO_2:SnO_2:0.2Al_2O_3:80H_2O$ | sodium hydroxide (Fisher) | 14 days | A |
| 8 | $2Na_2O:3.6SiO_2:SnO_2:0.2Al_2O_3:80H_2O$ | sodium hydroxide (Fisher) | 21 days | A |
| 9 | $2K_2O:3.6SiO_2:SnO_2:0.2Al_2O_3:80H_2O$ | potassium hydroxide (Fisher) | 21 days | G |

TABLE 5

| | CHEMICAL ANALYSES | | | | | |
|---|---|---|---|---|---|---|
| EXPERIMENT | WT % K | WT % Na | WT % Sn | WT % Si | WT % Al | WT % Al/Si |
| 6 | — | 10.61 | 24.71 | 20.71 | 1.06 | .05 |
| 7 | — | 13.05 | 24.76 | 18.86 | 2.53 | .14 |
| 8 | — | 11.99 | 23.99 | 18.49 | 5.55 | .31 |
| 9 | 14.22 | — | 22.29 | 18.36 | 2.22 | .13 |

TABLE 6

| X-RAY DIFFRACTION PATTERN FOR PHASE G | |
|---|---|
| dÅ | I/Io |
| 8.05 ± 0.20 | 17 |
| 6.58 ± 0.15 | 59 |
| 5.86 ± 0.15 | 76 |
| 5.35 ± 0.15 | 8 |
| 5.06 ± 0.10 | 18 |
| 4.84 ± 0.10 | 7 |
| 4.37 ± 0.10 | 40 |
| 4.02 ± 0.10 | 13 |
| 3.59 ± 0.08 | 18 |
| 3.51 ± 0.08 | 16 |
| 3.27 ± 0.08 | 17 |
| 3.12 ± 0.08 | 8 |
| 3.05 ± 0.08 | 19 |
| 2.98 ± 0.05 | 100 |
| 2.93 ± 0.05 | 38 |
| 2.86 ± 0.05 | 53 |
| 2.75 ± 0.05 | 12 |
| 2.67 ± 0.05 | 14 |
| 2.57 ± 0.05 | 10 |
| 2.50 ± 0.05 | 12 |
| 2.41 ± 0.05 | 9 |
| 2.14 ± 0.05 | 14 |
| 2.04 ± 0.05 | 12 |
| 1.93 ± 0.05 | 19 |
| 1.84 ± 0.05 | 10 |

TABLE 7

| | | REACTION CONDITIONS | | |
|---|---|---|---|---|
| EXPERIMENT | REACTANT RATIOS | ALUMINA SOURCE | REACTION TIME | PHASE |
| 10 | $2K_2O:3.8SiO_2:SnO_2:0.1Ga_2O_3:80H_2O$ | potassium hydroxide (Fisher) | 14 days | G |
| 11 | $2Na_2O:3.6SiO_2:SnO_2:0.2Ga_2O_3:80H_2O$ | sodium hydroxide (Fisher) | 14 days | B |

TABLE 8

| | CHEMICAL ANALYSES | | | | | |
|---|---|---|---|---|---|---|
| EXPERIMENT | WT % K | WT % Na | WT % Sn | WT % Si | WT % Al | WT % Ga/Si |
| 10 | 16.40 | — | 22.60 | 17.59 | 2.08 | 0.12 |
| 11 | — | 9.46 | 23.98 | 18.50 | 4.72 | 0.26 |

TABLE 9

| 2 theta | $d_{obsv}$ | I/Io |
|---|---|---|
| 5.577 | 15.8337 | 2.0 |
| 12.202 | 7.2472 | 5.5 |
| 13.254 | 6.6744 | 1.6 |
| 14.107 | 6.2728 | 72.1 |
| 15.802 | 5.6036 | 74.8 |
| 18.794 | 4.7175 | 10.7 |
| 20.061 | 4.4223 | 19.3 |
| 21.286 | 4.1706 | 2.4 |
| 23.584 | 3.7692 | 7.2 |
| 24.656 | 3.6076 | 8.5 |
| 25.681 | 3.4659 | 2.3 |
| 26.689 | 3.3373 | 44.4 |
| 28.568 | 3.1219 | 3.4 |
| 29.466 | 3.0288 | 100.0 |
| 31.203 | 2.8640 | 2.8 |
| 32.040 | 2.7910 | 7.3 |
| 32.872 | 2.7223 | 41.3 |
| 35.197 | 2.5476 | 6.5 |
| 36.701 | 2.4466 | 18.4 |
| 37.440 | 2.4000 | 5.2 |
| 38.484 | 2.3373 | 7.5 |
| 39.536 | 2.2774 | 5.4 |

TABLE 9-continued

| 2 theta | $d_{obsv}$ | $I/I_o$ |
|---|---|---|
| 41.558 | 2.1712 | 5.8 |
| 43.507 | 2.0783 | 1.4 |
| 44.128 | 2.0505 | 18.1 |
| 44.769 | 2.0226 | 2.1 |
| 46.011 | 1.9709 | 1.6 |
| 46.606 | 1.9471 | 14.5 |
| 47.205 | 1.9238 | 17.0 |
| 48.969 | 1.8585 | 3.7 |
| 49.562 | 1.8377 | 8.8 |

The substituted alkali-metal:tin:silica reaction system was found to yield an extended class of crystalline, microporous materials containing tin, silicon, and germanium, aluminum, zinc, gallium, or mixtures thereof and oxygen as framework species. The phases generated in this system are structure types, analogous to those found in the rim tin-silica system. They display reversible water loss, and are capable of ion exchange.

The novel substituted stannosilicates of this invention have a variety of uses, e.g., because the alkali metal can be exchanged as in a zeolite material, nuclear waste clean up can be effected when M in the generic formula is radioactive cesium or strontium. Substitution of silicon by aluminum, zinc and gallium enhance such exchange properties by increasing the strength of the $OH^{31}$ groups, and therefore, increasing their interaction with polar molecules; e.g., $H_2S$, $NH_3$, etc.

A particular utility for the material is as a hydrogen sulfide sorbent. Catalytic reforming reactions, for example, processes utilizing a supported nobel metal (e.g., platinum) catalyst to upgrade the octane level of naphtha, produce hydrogen which can be recycled to the reaction zone. Because naphtha feeds generally contain low sulfur levels which can build up during recycle processes and cause catalyst deterioration, the recycle hydrogen stream containing some hydrogen sulfide is passed through a sorbent to reduce the sulfide level of the recycle hydrogen. This prevents poisoning of the catalytic metal site by the sulfur compounds.

The sorbent process can be conducted at reforming pressures, e.g., 125 psig to about 600 psig, to avoid recompression of the hydrogen and at temperatures ranging from about 50° C. to 500° C. Hydrogen flow rates or space velocities, that is, volume of feed per hour per volume of sorbent, are easily determined based on the desired level of hydrogen sulfide removal, usually in excess of about 80%, preferably in excess of about 90%. Similar sorption processes are used to remove $H_2S$ from various hydrocarbon streams containing $H_2S$ such as sour natural gas streams, and streams resulting from petrochemical refining operations.

The following example shows the ability of a form of the stannosilicate material to remove hydrogen sulfide from hydrogen streams and, more importantly, the regenerability of the stannosilicate so that it can be used and reused in multicycle fashion. In catalytic reforming operations, it is normal to have two or more beds of hydrogen sulfide sorbent so that the sulfide can be continuously adsorbed in one bed or another while the bed that is off stream is being regenerated. Such processes will be rather obvious to those skilled in the art.

Regeneration of the substituted, stannosilicate is readily effected by passing a small amount of hydrogen through the sorbent substituted stannosilicate for several hours, e.g., one hour to 24 hours, while maintaining a positive pressure and at higher temperature than the adsorbing cycle but within the same general temperature range.

EXAMPLE 5

A stannosilicate prepared in the same manner as the alumino-substituted stannosilicate of Example 1 above was exchanged with $NH_4+$ and loaded into a thermogravimetric analyzer and heated overnight at 650° F. in flowing hydrogen. 10.5% volatile matter, corresponding to 9.45 mg of the original 90.01 mg charge was lost. The results of several adsorption/desorption cycles are shown in Table 10 and demonstrate the ability of these highly crystalline materials to separate $H_2S$ from $H_2S$ containing streams.

TABLE 10

| $H_2S$ Sorption Data for Phase A | | | |
|---|---|---|---|
| | Temp. | Time | Wt. Gain (Loss) |
| Cycle I | | | |
| sorb | 10% $H_2S/H_2$ | 66° C. | 6.5 hours | 5.05 mg |
| desorb | $H_2$ | 316° C. | overnight | (4.80) |
| Cycle II | | | |
| sorb | 0.2% $H_2S/H_2$ | 66° C. | 3.35 hours | .60 mg |
| desorb | $H_2$ | 316° C. | overnight | (.55) |
| Cycle III | | | |
| sorb | 0.2% $H_2S/H_2$ | 66° C. | 2.35 hours | .36 mg |
| desorb | $H_2$ | 316° C. | overnight | (.37) |
| Cycle IV | | | |
| sorb | 0.2% $H_2S/H_2$ | 66° C. | 6.67 hours | .67 mg |
| desorb | $H_2$ | 316° C. | overnight | (.67) |
| Cycle V | | | |
| sorb | 0.2% $H_2S/H_2$ | 66° C. | 6.67 hours | 0.86 mg |
| desorb | $H_2$ | — | — | — |

Novel substituted stannosilicate phases were prepared having structures comprised of corner sharing tin oxide octahedra and silicon germanium, aluminum, zinc, gallium oxide or mixtures thereof, tetrahedra. These frameworks are generated hydrothermally from reaction gels containing base cations and a source of tin, silicon and germanium, aluminum, zinc, or gallium or mixtures thereof. The structure that results from a particular synthesis is highly dependent on the cation employed in the reaction. Cation mixtures were employed in several syntheses to generate new phases or to improve the purity of phases produced by single-cation systems.

What is claimed is:

1. Crystalline substituted stannosilicate of the formula

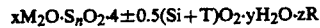

$xM_2O \cdot S_nO_2 \cdot 4 \pm 0.5(Si+T)O_2 \cdot yH_2O \cdot zR$ wherein M is a Group 1A metal, a Group IIA metal, whereupon $M_2O$ becomes MO, or a quaternary amine; T is germanium, aluminum, gallium, zinc or mixtures thereof;
x is 1.5 to 4
y is 4 to 15
R is an amine; and
Z is 0 to 4
wherein the framework species comprises tin in octahedral coordination, Si and T in tetrahedral coordination, and oxygen.

2. The composition of claim 1 having the x-ray diffraction pattern of phase A as shown in Table 3.

3. The composition of claim 1 having the x-ray diffraction pattern of phase G as shown in Table 6.

4. The composition of claim 1 having the x-ray diffraction pattern of phase B as shown in Table 10.

5. The composition of claim 1 wherein T is germanium.

6. The composition of claim 1 wherein T is gallium.

7. The composition of claim 1 wherein T is aluminum.

8. The composition of claim 1 wherein T is zinc.

9. The composition of claim 1 wherein the ratio of T:Si is about 0.02 to about 0.40.

10. A process for preparing crystalline substituted stannosilicates wherein the framework comprises tin in octahedral coordination, Si and a metal of the group consisting of germanium, gallium, aluminum, or mixtures thereof in actuahedral coordination, and oxygen which comprises reacting a water soluble tin salt, a source of silicon, a source of germanium, gallium, zinc or aluminum, and a Group IA or IIA metal hydroxide or mixtures thereof or amine or alkylammonium compound in an aqueous medium and recovering substituted stannosilicate.

11. The process of claim 9 wherein the ratio of tin:silicon and germanium, gallium, zinc, aluminum or mixtures thereof is no greater than about 1:20.

12. The process of claim 9 wherein the reaction medium is aged at ambient conditions for a period sufficient to initiate nucleation.

13. The process of claim 11 wherein a nucleating compound is added to the reaction mixture in sufficient amount to initiate nucleation.

14. The process of claim 9 wherein the crystalline substituted stannosilicate is treated with an acid.

15. The process of claim 9 wherein the crystalline substituted stannosilicate is dried thereby removing substantially all the water contained therein.

16. A process for removing $H_2S$ from a feed stream containing $H_2S$ and hydrocarbons or hydrogen or both comprising contacting the feedstream with a crystalline substituted stannosilicate of the formula $$xM_2O \cdot S_nO_2 \cdot 4 \pm 0.5(Si+T)O_2 \cdot yH_2O \cdot zR$$

wherein M is a Group IA metal, a Group IIA metal, whereupon $M_2O$ becomes MO, or a quaternary amine; T is germanium, aluminum, gallium, zinc, or mixtures thereof;

x is 1.5 to 4 y is 4 to 15

R is an amine; and

Z is 0 to 4 and recovering a stream depleted in $H_2S$.

* * * * *